April 14, 1959   J. F. MURRAY   2,881,704
PRESSURE LOADED PUMP CONSTRUCTION
Filed Oct. 8, 1953   3 Sheets-Sheet 1
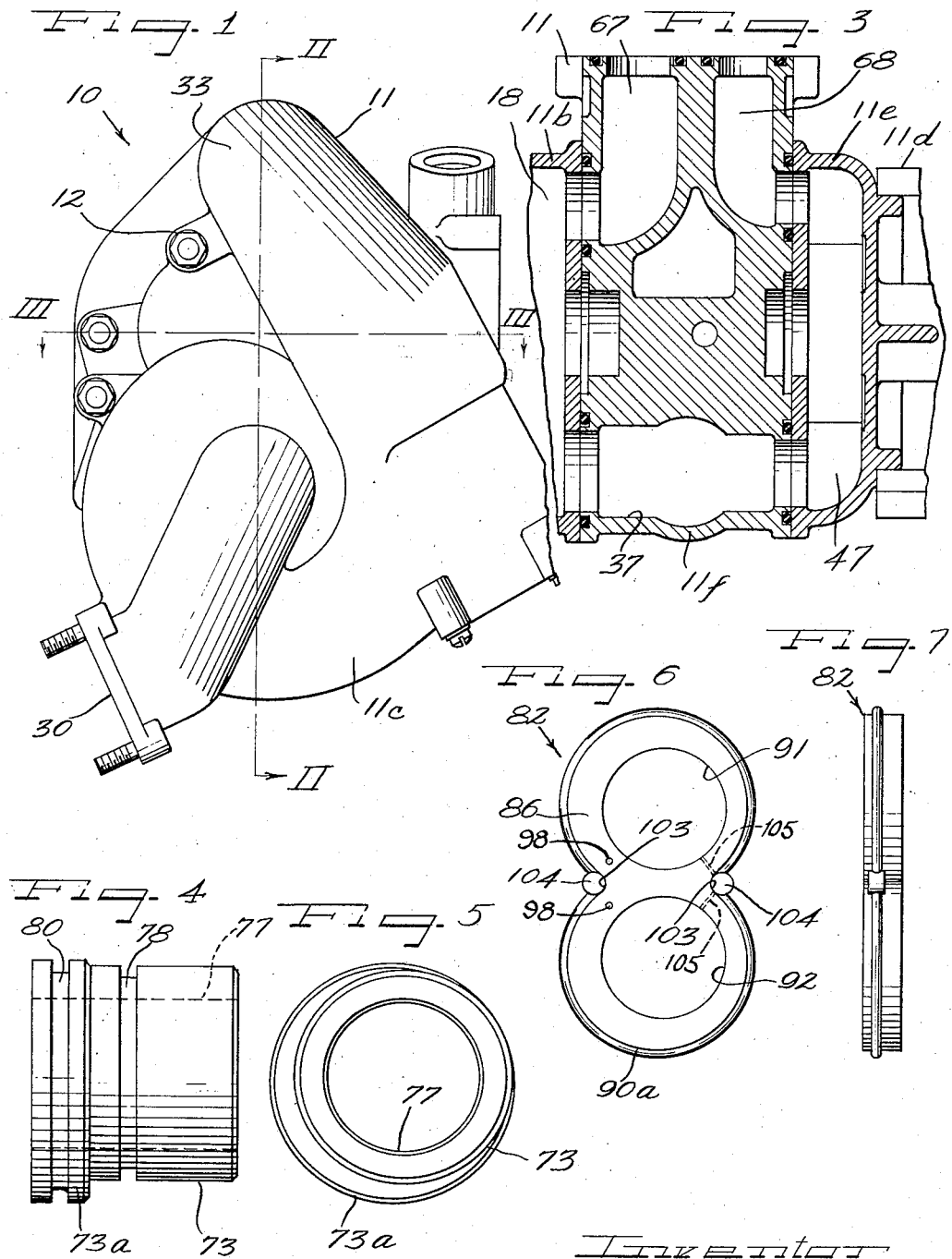

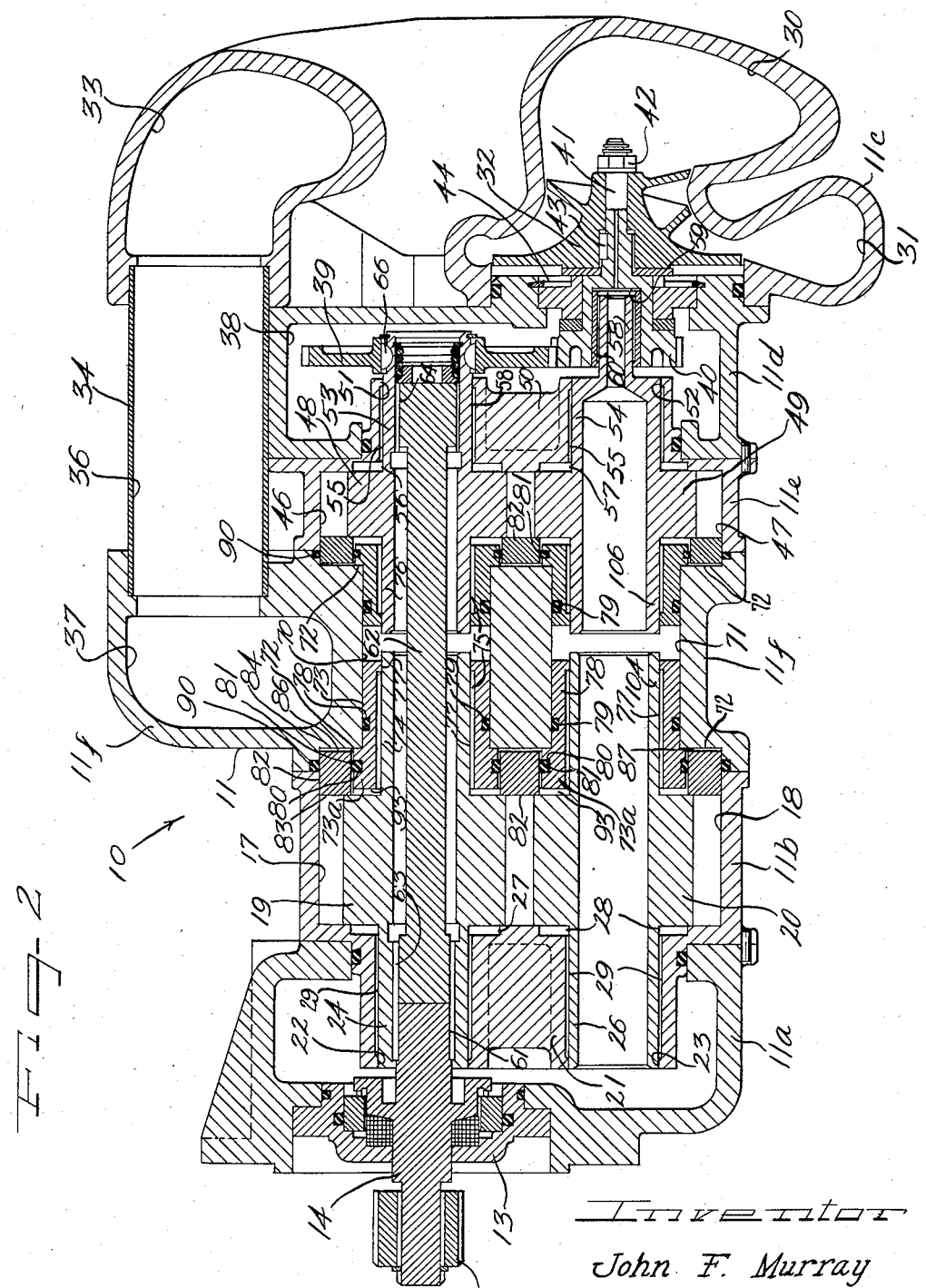

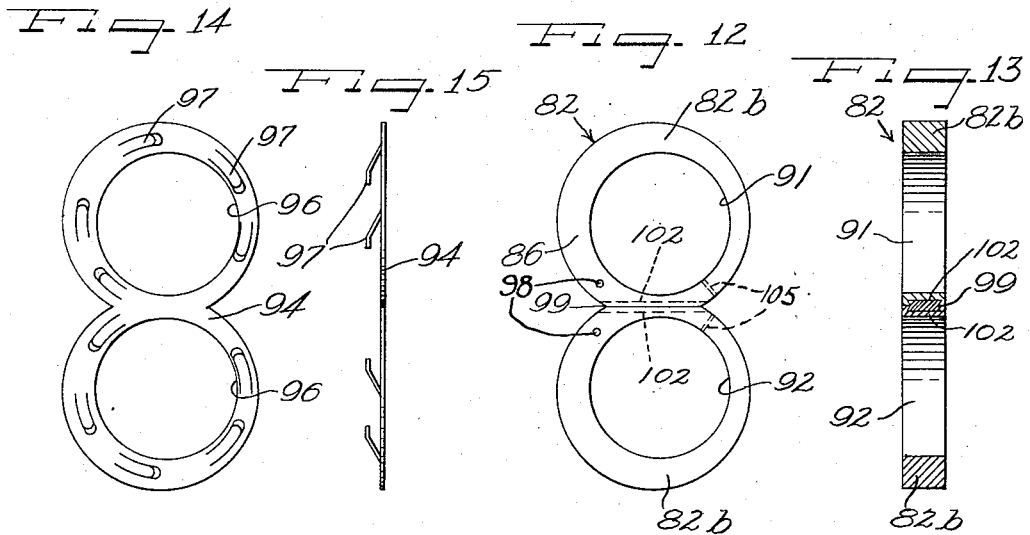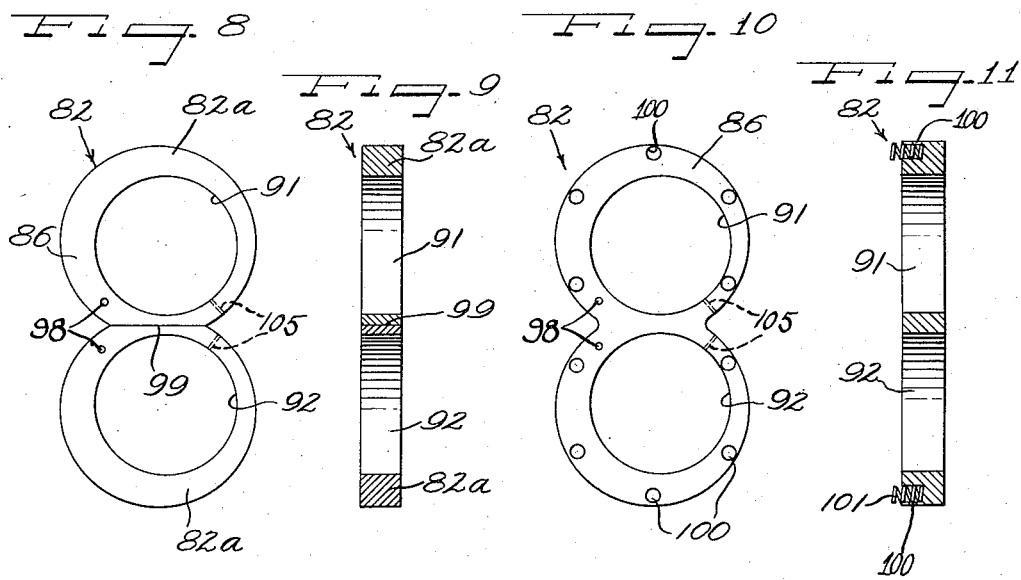

United States Patent Office 2,881,704
Patented Apr. 14, 1959

2,881,704

PRESSURE LOADED PUMP CONSTRUCTION

John F. Murray, Macedonia, Ohio, assignor to Thompson Products, Inc., Cleveland, Ohio, a corporation of Ohio Application October 8, 1953, Serial No. 384,861

11 Claims. (Cl. 103—5)

This invention relates generally to pump constructions and more particularly to a postive displacement gear pump having improved sealing means at the side faces of the gears loaded by pump generated pressure.

In the gear pump construction heretofore provided wherein movable pressure loaded bearings are utilized to confine pump fluid in the tooth spaces of the gears, a vexatious problem has been encountered in obtaining a squarely mating condition between the surfaces utilized for journalling the rotary gears and the surfaces utilized for sealing against the adjoining gear side faces.

Because the position of the centroid of the force tending to separate the movable bearing portions from the gears changes with both speed of rotation and discharge pressure of the pump, it is virtually impossible to attain a perfect hydraulic loading of the pressure sealing faces against the side faces of the gears. It is necessary, therefore, to depend largely upon close clearances between the bearing members and the pump housing in order to offset the tendency of the hydraulic loading to twist the bearing members out of the square with the mating components.

The rotational bearing load also tends to produce a twisting or mis-aligning of the bearing bushings in the pump housing, thereby detrimentally affecting the squareness of the pressure sealing face against the adjoining side faces of the gears. The limit of this tendency to mis-align due to pressure rise across the pump is the normal clearance between the bearing outer diameter and the housing associated therewith. These clearances in a structure utilizing an integral combination end plate and bearing bushing have to be sufficient to eliminate binding between the bearing bushing member and the pump housing.

In accordance with the principles of the present invention, the detrimental effects of bearing loads upon the positioning of the pressure loaded end plate are eliminated by forming a multi-piece bushing construction wherein the components developing a bearing function are completely separated from the components developing the pressure sealing function. The present invention provides further advantages in utilizing a one-piece pressure plate construction which mates with both rotary gears of a pair of intermeshing gears.

In accordance with the principles of the present invention, a pump is provided wherein a housing having intersecting bores has an inlet and an outlet. Rotary intermeshing gears are in the bores and move fluid from the inlet to the outlet. A generally tubular shaped bearing member is provided in the housing adjacent each bore. Each bearing member has a portion concentric with one of the bores and each bearing member further includes a radially extending portion which is offset eccentrically towards the inlet side of the pump.

A figure 8-shaped pressure plate or end plate member is slidable on the radially extending portions of the bearing members and provides a front sealing face to confine fluids in the tooth spaces of the gears. The end plate member further provides a pressure loading face which is spaced from an adjoining wall of the housing and forms together therewith a pressure control chamber communicating with pressured fluid at pressures generated by the pump so that the pressure plate means will be loaded against the gears.

The pressure plate member is preferably made wider than the radially extending portions of the bearing members, thereby to provide a recess adjacent the gears which communicates with pump inlet.

Although the present invention contemplates the construction of the pressure plate means in the form of either a one-piece member or as two separate generally annular pieces, the pressure plate means can conveniently take the form of two generally annular pieces having abutting surfaces with fastening means at the abutting surfaces joining the pieces in firm assembly with one another.

For example, the fastening means may comprise intermating male and female members forming a mechanical joint, or may take the form of an adhesive, or in an alternative form of the invention, may comprise female parts on both of the pieces with a male member concurrently received by both parts to retain the pieces in firm assembly with one another.

It is an object of the present invention to provide pressure loaded end plate means for a gear pump wherein a one-piece construction eliminates clearances and fittings required in a multi-piece construction, thereby minimizing potential internal leakage paths and skilled fitting operations.

Another object of the present invention is to provide a one-piece pressure end plate construction wherein twisting forces are minimized.

Yet another object of the present invention is to provide an end plate construction for a pressure loaded gear pump wherein multiple pressure sealing faces are machined in a single plane.

Yet another object of the present invention is to provide pressure loaded end plate means for a gear pump wherein the effect of bearing loading on the pressure sealing surface is completely eliminated.

Many other advantages, features and additional objects of the present invention will become manifest to those versed in the art upon making reference to the detailed description which follows and the accompanying sheets of drawings in which a preferred structural embodiment of a gear pump incorporating the principles of the present invention is shown by way illustrative example only.

On the drawings:

Figure 1 is an end elevational view of a pump incorporating the principles of the present invention;

Figure 2 is a cross-sectional view taken substantially on line II—II of Figure 1;

Figure 3 is a fragmentary cross-sectional view with parts removed for the sake of clarity taken substantially on line III—III of Figure 1;

Figure 4 is an elevational view of a bearing member provided in accordance with the principles of the present invention;

Figure 5 is an end elevational view of a bearing member shown in Figure 4;

Figure 6 is an elevational view, somewhat reduced, of an end plate member provided in accordance with the principles of the present invention;

Figure 7 is a side elevational view of the end plate member shown in Figure 6;

Figures 8 and 9 are views similar to Figures 6 and 7 showing a modified form of an end plate construction provided in accordance with the principles of the present invention;

Figures 10 and 11 show another embodiment of an end plate construction;

Figures 12 and 13 show yet another embodiment of an end plate construction provided in accordance with the principles of the present invention;

Figure 14 is an elevational view of a loading spring provided for the pump of Figures 1 and 2; and Figure 15 is an end elevational view of the spring shown in Figure 14.

As shown on the drawings:

The pump of the present invention is indicated generally by the reference numeral 10 and comprises a housing or casing 11 made up of a plurality of assembled together sections secured in firm assembly with one another by a plurality of fasteners 12.

Referring particularly to Figure 2, it will be noted that the housing 11 comprises a first housing section 11a which receives a cover member 13 through which is passed a stub shaft 14. A spline coupling 16 on one end of the shaft 14 adapts the shaft 14 for attachment to a power source (not shown). The cover member 13 encloses the usual journaling and shaft sealing elements which need not be described in further detail insofar as the principles of the present invention are concerned.

The pump 10 is provided with a second housing section 11b which is preferably made out of a good bearing metal material such as bronze or the like and includes a pair of intersecting bores 17 and 18, respectively, forming a pumping chamber for rotary fluid displacement means comprising a driver gear 19 meshing with a driven gear 20.

The housing section 11b includes a protruding portion 21 which extends into the housing section 11a and which is provided with a pair of spaced bores 22 and 23 adjacent each respective bore 17 and 18 and in concentric relationship therewith to receive and journal the extending shaft portions of the driver and driven gears 19 and 20, which shaft portions are indicated at 24 and 26 respectively.

To assist in the flooding of the bearing surface between the walls of the bores 22 and 23 and the shaft extensions 24 and 26 with lubricant and coolant, each of the bores 22 and 23 is provided with a small counterbore indicated at 27 and 28, respectively, forming an annular lubricant recess adjacent the adjoining side face of the gears 19 and 20. Axially extending lubricant grooves 29 extend along the bearing surface and communicate pumping medium from the recesses 27 and 28 for cooling and lubricating purposes.

At the opposite end of the pump 10, the housing 11 is provided with a housing section 11c having an inlet 30 (Figure 1) communicating fluid to a volute pumping chamber 31 in which is rotated a centrifugal pump impeller 32.

As will be clearly understood from referring to Figures 1, 2 and 3, fluid initially pressurized by the centrifugal pump impeller 32 will be discharged from the volute pumping chamber 31 through an intermediate passage defining means 33, through a conduit section indicated at 34 providing a passage 36 and into a chamber 37 formed by an intermediate housing section indicated at 11f.

The housing section 11c is mounted directly adjacent an additional housing section 11d recessed to provide a gear box 38 and in which is rotated a driver gear 39 and an intermeshing driven gear 40. The driven gear 40 has an extending shaft portion 41 to which is connected the centrifugal pump impeller 32, fastening means being indicated at 42 and key means being indicated at 43 to facilitate assembly of the pump impeller 32 on the shaft extension 41 in firm assembly therewith. Bearing and seal means are also indicated at 44 between the shaft extension 41 and the housing section 11b to assist in providing a journal support for the impeller 42 and the driven gear 40.

The pump 10 is further provided with a housing section 11e providing a pair of intersecting bores 46 and 47, respectively, forming a pumping chamber in which is rotated a rotary fluid displacement means, comprising a rotatable driver gear 48 meshing with a rotatable driven gear 49. The housing section 11e preferably comprises a good bearing material such as bronze or the like and includes a protruding portion 50 which extends into the housing section 11d which provides adjacent the intersecting bores 46 and 47 a pair of bores 51 and 52 in concentric relationship to the bores 46 and 47, thereby to provide a bearing surface for journalling a shaft extension 53 and 54 provided on the driver and driven gears 48 and 49, respectively.

To assist in the flooding of these bearing surfaces with a coolant and lubricant, the housing section 11e is provided with counterbores in the area of the bores 51 and 52 adjacent the adjoining side face of the gears 48 and 49, thereby to provide annular lubricant recesses 56 and 57. Axially extending lubricant grooves 55 are also provided which communicate lubricant fluid from the recesses 56 and 57 along the length of the bearing surface between the walls of the bores 51 and 52 and the shaft extensions 53 and 54. The recesses 27, 28, 56, 57 are the same size as the recesses 93 to be described presently.

The shaft extension 54 on the driven gear 49 is provided with a stub end 58 received in a recess 59 formed in the gear 40. A bearing insert 60 is provided between the gear 40 and the stub end 58 so that the gear 40 will be substantially journalled for rotation on the stub end 58 of the shaft extension 54. Thus, even though the driven gear 49 is itself a rotatable member, it also functions to provide a bearing and journalling support for the rotatable gear 40, a function which is adequately developed irrespective of the relative rotational speeds between the driven gear 49 and the driven gear 40.

The stub shaft 14 at its inner end is provided with a splined coupling joint 61 joining the shaft extension 24 and the stub shaft 14 for co-rotation. It will be noted that all of the gear members 19, 20, 48, 49 are provided with passageways extending axially through the respective gear members. Accordingly, in the passageway jointly provided by the driver gears 19 and 48, a shaft 62 is provided having a splined coupling 63 at one end thereof locking the shaft 62 for co-rotation with the stub shaft 14 and the driver gear 19 and having a splined coupling joint 64 at the opposite end thereof so as to lock the driver gear 48 for co-rotation with the shaft 62 and the stub shaft 14.

The shaft extension 53 on the driver gear 48 extends beyond the protruding portion 50 and receives in co-rotatable assembly therewith the gear 39, keying means being indicated at 66. It will be understood that the gear 39 meshes with the gear 40 so that upon rotation of the stub shaft 14, both sets of rotary intermeshing gears will operate as well as the centrifugal pump impeller 32.

As is clearly depicted in Figure 3, the gear pump stages are in series with respect to the centrifugal pump stage, the chamber 37 providing a common inlet for both of the pumping chambers 17, 18, and 46, 47.

It will be further noted upon referring to Figure 3, however, that the pumping chamber 17, 18 is provided with an outlet 67 formed in the housing section 11f and the pumping chamber 46, 47 is provided with a separate outlet 68 formed in the housing section 11f.

The additional journalling means and the loaded sealing means provided in accordance with the principles of the present invention will now be described in detail.

The housing section 11f is provided with a pair of spaced bores 70 and 71 respectively which lie concentric to and adjacent to the bores 17 and 46 and the bores 18 and 47, respectively. The bores 70 and 71 are counterbored at opposite ends as at 72, each counterbore 72 being generally complementary to one of the associated bores 17 or 46 and 18 or 47.

Received in each of the bores 70 and 71 is a bearing member indicated generally at 73. A bearing member 73 is received in each respective end of the bore 70 and as shown in the drawings, the bearing members 73 are somewhat different in size, however, the physical and functional characteristics of each are similar and, accordingly, like reference numerals will be applied for the sake of convenience and clarity in understanding of the invention.

Each bearing member 73 is a generally tubular shaped part and the main body portion thereof is arranged to be concentrically disposed between a shaft extension 74 or 76 on the driver gear 19 or driver gear 48, respectively. The walls of bore extending through the bearing member 73 provides a bearing surface 77 for journalling the respective shaft extensions 74 and 76 and including blind end lubrication grooves 75.

At one end of each bearing member 73 is provided a radially extending portion 73a which is offset eccentrically with respect to the main body portion thereof and, when assembled in the pump 10, the bearing members 73 are arranged so that the radially extending portion 73a will be offset eccentrically towards the inlet side of the pump.

The outer peripheral surface of each bearing member 73 is generally complementary in size to each bore 70 or 71 and has a light press fit relationship, thereby to effect a firm assembly of each bearing member 73 in the housing section 11f. An annular peripheral groove 78 is also provided in the outer peripheral surface to receive a sealing member 79 conveniently comprising a rubber O-ring and providing a seal between the housing section 11f and a bearing member 73.

An annular groove 80 is also provided in the outer peripheral surface of each radially extending portion 73c and receives a sealing member which may conveniently take the form of a rubber O-ring seal 81 for a purpose to be explained presently.

A generally figure 8-shaped pressure plate means 82 is slidably mounted on the radially extending portions of each respective pair of bearing members 73. The figure 8-shaped pressure plate means 82 provides a front sealing face 83 which extends from the tips of the gear teeth on the associated gear impellers radially inwardly of the root diameter of the gear teeth so as to confine fluids in the tooth spaces of the gears.

Moreover, the pressure plate means 82 are spaced from an adjoining wall 84 of the housing section 11f, the pressure plate means 82 providing a reactive pressure face 86 which, together with the wall 84 forms a pressure control chamber 87.

Means are provided to establish a fluid passageway communicating fluids at pressure generated by the pump 10 to the pressure control chambers 87 for loading the pressure plate means 82 against the adjoining side faces of the gears.

The outer peripheral surface of the pressure plate means 82 prescribes a figure 8 configuration and is complementary to a corresponding pair of bores 17 and 18 or 46 and 47. A sealing member 90 is provided at the sliding surfaces between the pressure plate means 82 and the housing 11, thereby precluding leakage from the pressure control chamber 87.

The pressure plate means 82 is also provided with a pair of bores 91 and 92 which are eccentrically offset towards one side of the pressure plate means so as to be complementary to the radially extending portion 73a on the bearing member 73. It will be understood that the sealing members 81 engage the walls of the bores 91 and 92, thereby to confine fluid in the pressure control chamber 87 and to further establish a sealing joint between the radially extending portion 73a and the pressure plate means 82.

The pressure plate means 82 are preferably made of a width wider than the radially extending portion 73a on the bearing member 73 associated therewith, thereby to provide a recess 93. Means are provided establishing a fluid passageway communicating pump inlet pressure to each recess 93, for example as at 105. By connecting the recesses 93 to the inlet pressure of the gear pumps, it will be apparent that the quantitative value of pressure will closely approximate the discharge pressure of the centrifugal pump impeller 32.

To effect an initial loading of the pressure plate means 82 against the adjoining side faces of the gears, spring means may be provided as shown in Figures 14 and 15. The spring means comprise figure 8-shaped sheet form members 94 recessed as at 96 and having a plurality of struck-out spring fingers 97 and extending axially with respect to the sheet form member 94. The sheet form members 94 are located in the pressure control chambers 87, thereby to exert a spring biasing force between the housing 11 and the pressure plate means 82 for initially loading the pressure plate means 82 against the adjoining side faces of the gears.

In the drawings, there are illustrated several physical embodiments of the pressure plate means 82 provided in accordance with the principles of the present invention. In each instance, it will be noted that there is provided an integral plate construction of a figure 8 configuration having the bores 91 and 92 offset towards the inlet side so as to provide a reactive pressure face 86 which increases in effective area (subject to pressure in the control chamber 87) towards the outlet side of the pump. There is thus provided less total loading on the inlet side and increased total loading on the discharge side and, accordingly, a better balance is achieved with the separating force which varies from a maximum on the discharge side of the pump to a minimum on the inlet side of the pump. In other words, the centroid of the pressure loading force acting on the reactive pressure face 86 and tending to move the pressure plate means 82 toward sealing engagement with adjoining side faces of the gears is brought in line with the centroid of the separating forces acting on the opposite sealing face 83 of the pressure plate means 82, which separating force tends to move the pressure plate means 82 away from sealing engagement with the adjoining side faces of the gears. Each of the pressure plate means 82 is also characterized in common by passages 98 formed on the discharge side of the pump and communicating fluid at pressures generated by the pump to the pressure control chamber 87.

In Figures 8 and 9, the pressure plate means 82 comprises two generally annular pieces 82a, 82a having flat abutting surfaces 99. Fastening means are provided at the abutting surfaces 99 to maintain the pieces 82a, 82a in firm assembly with one another. For example, the pieces 82a, 82a may be sweat soldered at the abutting surfaces 99 while accurately positioned in proper position with a locating jig.

In Figures 10 and 11, the pressure plate means 82 comprises a one-piece construction wherein a plate member is broached into proper configuration.

In this form of the invention, a plurality of circumferentially spaced recesses 100 are provided in the reactive pressure face 86, each receiving a small coil spring 101 to provide initial loading of the pressure plate means 82. In this form of the invention, the flat spring means of Figures 14 and 15 is eliminated in view of the functioning of the coil spring 101.

In Figures 12 and 13, the pressure plate means 82 comprises two separate pieces 82b, 82b. In this form of the invention, an undercut slot 102 is formed in each piece at the flat abutting surfaces 99. While the halves are located in a jig fixture, a plastic aggregate is introduced into the slots 102, for example, a resin in liquid form may be forced into the slot, and thereafter, the plastic material is permitted to harden in situ. As a result of following this procedure, the pressure plate means 82 forms a one-piece assembly which is of sufficient strength to withstand normal operating stresses in a pressure loaded gear pump.

In the embodiment of Figures 6 and 7, the pressure plate means 82 comprises a one-piece plate which is fabricated to embody the desired physical properties by a broaching process. In this construction, the point of juncture of the opposite halves is characterized by a true radius curve portion indicated at 103. The sealing member which is located between the outer peripheral surface of the pressure plate means 82 and the housing 11 in indicated at 90a and includes two separate nubbins 104 which match the curves 103, thereby to provide a seal for any possible leakage path across the flat of the pressure plate means.

The bearing member 73 and end plate means 82 for each respective gear 19, 20, 48 and 49 are of similar construction and cooperate with shaft extensions 104 and 106 in the bore 71 in the same manner as hereinabove described. Accordingly, like reference numerals have been applied wherever appropriate.

In an aircraft installation, the inlet pressure to the pump may vary over a wide range. This same range of pressures will work on the ends of the bearings 73 at the mid point chamber of body member 11f. In the case of the one piece bearing this pressure affects the total pressure loading. Of course some of this change in pressure is neutralized by the consequent changes in the separating forces due to change in inlet pressure. This latter effect is slight however compared to the former.

A definite advantage exists in having the diameter of the recess 93 approach as close as possible to the root diameter of the gear. The difference between these two diameters should be just sufficient to provide a sealing area. Any further contact area between the gear face and the end plate face below the root diameter of the gear serves only to introduce a non-calculatable variable affecting the total force tending to force the end plate from the gear. If there is a considerable area of contact between the end plate and gear below the root diameter, the total force existing there acting to separate the gear and end plate will vary according to the fit between the gear face and the end plate. This total force is a function of the pressure gradient existing between the two faces which will be a maximum at the point adjacent to the root of the gear and a minimum at the inner periphery of the bearing. This gradient exists due to the leakage across the mating faces so that as the clearance is reduced due to squareness of the mating parts, the leakage will be reduced and the total separating force is consequently reduced.

Although minor structural modifications might be indicated by those versed in the art, it should be understood that I wish to embody within the scope of the patent warranted hereon all such modifications as reasonably and properly come within the scope of my contribution to the art.

I claim as my invention:

1. In a pump, a housing having intersecting bores providing a pumping cavity with an inlet and an outlet, rotary intermeshing gears in said pumping cavity moving fluid from said inlet to said outlet, generally tubular shaped bearing members in said housing each having a portion concentric with one of said bores and each including a radially extending portion of smaller outer diameter than the root diameter of the corresponding adjoining gear and offset radially towards the inlet side of the pump, a figure 8-shaped pressure plate having means forming a pair of openings therein complementary in size to and slidable on said radially extending portions and providing a front sealing face to confine fluids in the corresponding adjoining tooth spaces of the gears, said pressure plate means being sealed against said housing and said bearing members and having a rear face spaced from an adjoining wall of said housing to form together therewith a pressure control chamber, and means providing a fluid passageway communicating fluid at pressures generated by said pump to said control chamber to load said pressure plate means against said gears.

2. In a pump, a housing having intersecting bores providing a pumping cavity with an inlet and an outlet, rotary intermeshing gears in said pumping cavity moving fluid from said inlet to said outlet, generally tubular shaped bearing members in said housing each having a portion concentric with one of said bores and each including a radially extending portion of smaller outer diameter than the root diameter of the corresponding adjoining gear and offset radially towards the inlet side of the pump, a figure 8-shaped pressure plate having means forming a pair of openings therein complementary in size to and slidable on said radially extending portions and providing a front sealing face to confine fluids in the corresponding adjoining tooth spaces of the gears, said pressure plate means being sealed against said housing and said bearing members and having a rear face spaced from an adjoining wall of said housing to form together therewith a pressure control chamber, and means providing a fluid passageway communicating fluid at pressures generated by said pump to said control chamber to load said pressure plate means against said gears, said pressure plate means having an axial dimension in excess of said radially extending portions to provide a recess adjacent said gears, and means providing a fluid passageway communicating pump inlet pressure to said recess.

3. In a pump, a housing having intersecting bores providing a pumping cavity with an inlet and an outlet, rotary intermeshing gears in said pumping cavity moving fluid from said inlet to said outlet, generally tubular shaped bearing members in said housing each having a portion concentric with one of said bores and each including a radially extending portion of smaller outer diameter than the root diameter of the corresponding adjoining gear and offset radially towards the inlet side of the pump, a figure 8-shaped pressure plate having means forming a pair of openings therein complementary in size to and slidable on said radially extending portions and providing a front sealing face to confine fluids in the corresponding adjoining tooth spaces of the gears, said pressure plate means being sealed against said housing and said bearing members and having a rear face spaced from an adjoining wall of said housing to form together therewith a pressure control chamber, and means providing a fluid passageway communicating fluid at pressures generated by said pump to said control chamber to load said pressure plate means against said gears, said pressure plate means comprising two generally annular pieces having chordal portions forming flat abutting surfaces, and fastening means at said flat abutting surfaces joining said pieces in firm assembly with one another.

4. In a pump, a housing having intersecting bores providing a pumping cavity with an inlet and an outlet, intermeshing gears in said pumping cavity having gear teeth moving fluid from said inlet to said outlet, generally tubular shaped bearing members in said housing each having a portion concentric with one of said bores and each including a radially extending circular portion of a diameter less than the root diameter of the gear teeth offset towards the inlet side of the pump, a figure 8-shaped pressure plate means having openings therethrough in which corresponding bearing members are received and being slidable on said radially extending portions of said bearing members and providing a front sealing face extending from inwardly of the root diameter of the gear teeth to the periphery thereof to confine fluids in the tooth spaces of the gears, said pressure plate means being sealed against said housing and said bearing members and having a rear face spaced from an adjoining wall of said housing to form together therewith a pressure control chamber, and means providing a fluid passageway communicating fluid at pressures generated by said pump to said control chamber to load said pressure plate means against said gears, said pressure plate means comprising two generally annular pieces having flat abutting chordal surfaces, and fastening means at said flat abutting chordal surfaces joining said pieces in firm assembly with one another, said fastening means comprising intermating male and female members forming a mechanical joint.

5. In a pump, a housing having intersecting bores providing a pumping cavity with an inlet and an outlet, intermeshing gears in said pumping cavity having gear teeth moving fluid from said inlet to said outlet, generally tubular shaped bearing members in said housing each having a portion concentric with one of said bores and each including a radially extending portion offset towards the inlet side of the pump, a figure 8-shaped pressure plate means slidable on said radially extending portions and providing a front sealing face extending from the outer periphery of said bearing member inwardly of the gear tooth root diameter to the outer periphery of the gears to confine fluids in the tooth spaces of the gears, said pressure plate means being sealed against said housing and said bearing members and having a rear face spaced from an adjoining wall of said housing to form together therewith a pressure control chamber, and means providing a fluid passageway communicating fluid at pressures generated by said pump to said control chamber to load said pressure plate means against said gears, said pressure plate means comprising two generally annular pieces having chordal portions forming flat abutting surfaces, and fastening means at said abutting surfaces joining said pieces in firm assembly with one another, said fastening means comprising an adhesive firmly connecting the pieces at said abutting surfaces.

6. In a pump, a housing having intersecting bores providing a pumping cavity with an inlet and an outlet, intermeshing gears in said pumping cavity having gear teeth moving fluid from said inlet to said outlet, generally tubular shaped bearing members in said housing each having a portion concentric with one of said bores and each including a radially extending portion offset towards the inlet side of the pump terminating inwardly of the gear teeth root diameter, a figure 8-shaped pressure plate means slidable on said radially extending portions and providing a front sealing face extending from said bearing member to the outer periphery of the gears to confine fluids in the tooth spaces of the gears, said pressure plate means being sealed against said housing and said bearing members and having a rear face spaced from an adjoining wall of said housing to form together therewith a pressure control chamber, and means providing a fluid passageway communicating fluid at pressures generated by said pump to said control chamber to load said pressure plate means against said gears, said pressure plate means comprising two generally annular pieces having chordal portions forming flat abutting surfaces, and fastening means at said abutting surfaces joining said pieces in firm assembly with one another, said fastening means comprising female parts on each piece and a male member concurrently received by and locking together both parts.

7. A pump comprising a housing having series interconnected pumping cavities including a volute recess having an inlet and a pair of intersecting bores having an outlet, a rotatable centrifugal impeller in said volute recess moving fluid from said inlet to said intersecting bores, rotary meshing gears in said bores moving fluid to said outlet, means interconnecting said gears and said impeller for co-rotation, a stationary bushing journalling each of said gears and a movable end plate for each gear provided with a sealing face to confine fluids in the tooth spaces of the gears, said stationary bushing member and the corresponding gear forming a recess radially inwardly of the corresponding one of said movable end plates adjacent the adjoining portions of the gears and inwardly of the tooth root diameter, means communicating gear generated pressure behind said movable end plates to pressure load said end plates against the gears, and means communicating impeller generated pressure to said recess.

8. A pump having a housing providing a pair of intersecting bores with an inlet and an outlet, intermeshing rotary gears in said bores moving fluid from the inlet to the outlet, a movable figure 8-shape pump pressure loaded end plate member in said housing having curved sides complementary in shape to adjoining curved walls of said bores and a flat sealing face confining fluid in the tooth spaces of the gears, said end plate member having a pair of spaced openings extending axially therethrough and intersecting said flat sealing face and generally tubular bearing members in said housing journalling said gears and each including a radially extending flange in a corresponding one of said openings sealed against and slidably supporting the adjoining surface of said figure 8-shaped end plate member, the outer diameter of said flange on each said tubular bearing member and the inner diameter of each said opening and of said sealing face being similar and being arranged to permit said end plate member to slide on said flange into sealing relation with the adjoining gear side face.

9. A pump having a housing providing a pair of intersecting bores with an inlet and an outlet, intermeshing rotary gears in said bores moving fluid from the inlet to the outlet, a movable figure 8-shape pump pressure loaded end plate member in said housing complementary in shape to said bores and confining fluid in the tooth spaces of the gears, said end plate member having two spaced apart openings formed therein and generally tubular bearing members in said housing journalling said gears and each including a radially extending flange having a peripheral surface sealing against and slidably supporting said figure 8-shaped end plate member at an adjoining surface provided by an edge portion of a corresponding one of said spaced openings, said flanges and the said corresponding openings of said end plate member being offset radially towards one side of the pump to provide a loading face subject to pump pressure which increases in effective area from the inlet towards the outlet side of the pump, the outer diameter of said peripheral surface of said radially extending flange and the inner diameter of said two spaced apart openings in said end plate member being similar and being arranged to permit said end plate member to slide on said peripheral surface into sealing relation with the adjoining gear side face.

10. A pump comprising a housing having intersecting bores with an inlet and an outlet, rotary fluid displacement gears in said bores moving fluid from the inlet to the outlet, a movable end plate member in said housing and providing a sealing surface to engage adjoining side faces of said rotary fluid displacement gears, and further providing a loading surface, means confining pump generated pressure against said loading surface for loading said member against the rotary fluid displacement gears, said end plate having a pair of spaced openings therein of lesser diameter than the root diameter of the corresponding gears eccentric with respect to said bores to shift the centroid of the pressure loading force on said loading surface towards alignment with the centroid of the pressure generated forces acting on said sealing surface, and a pair of separate bearing members in said housing to journal said rotary fluid displacement gears, said bearing members each including a tubular portion concentric with the rotational axis of said rotary fluid displacement means and a radially extending portion received in the said openings to slidably support said end plate member.

11. A pump comprising a housing providing a pair of intersecting bores having an inlet and an outlet, rotary gears in said bores moving fluid from the inlet to the outlet, a bushing in said housing opposite each bore to journal a corresponding gear, a movable end plate member encircling and slidably mounted on said bushings and providing a sealing face to confine fluid in the tooth spaces of the gears, said end plate member spaced from adjoining wall of said housing to form a pressure control chamber, means communicating pressure fluid generated by said pump to said chamber, and sealing members between said end plate member and said housing and between said end plate member and said bushings to confine fluid in said pressure control chamber, said bushings being spaced from an adjoining side face of said gears to provide a recess radially inwardly of said end plate member and radially inwardly of the tooth root diameter of said gears, said pump having a volute pumping chamber between said inlet and said bores, passage means between said recess and said volute chamber and a centrifugal impeller in said volute chamber to provide fluid at increased pressure to the inlet side of said bores and to said recess.

References Cited in the file of this patent

UNITED STATES PATENTS

| | | |
|---|---|---|
| 1,475,683 | Carrey | Nov. 27, 1923 |
| 1,771,863 | Schmidt | July 29, 1930 |
| 2,044,873 | Beust | June 23, 1936 |
| 2,055,587 | Pigott | Sept. 29, 1936 |
| 2,159,748 | Miller et al. | May 23, 1939 |
| 2,266,820 | Smith | Dec. 23, 1941 |
| 2,312,891 | Ferris | Mar. 2, 1943 |
| 2,420,622 | Roth et al. | May 13, 1947 |
| 2,527,941 | Lauck et al. | Oct. 31, 1950 |
| 2,540,235 | Berkley | Feb. 6, 1951 |
| 2,641,192 | Lindberg | June 9, 1953 |
| 2,649,740 | Murray et al. | Aug. 25, 1953 |
| 2,682,836 | Orr | July 6, 1954 |
| 2,688,925 | Thoren et al. | Sept. 14, 1954 |
| 2,695,566 | Compton | Nov. 30, 1954 |
| 2,706,452 | Hilton | Apr. 19, 1955 |
| 2,714,856 | Kane | Aug. 9, 1955 |
| 2,726,604 | Aspelin et al. | Dec. 13, 1955 |
| 2,756,681 | Oliver | July 31, 1956 |